(12) United States Patent
Green et al.

(10) Patent No.: US 6,779,269 B2
(45) Date of Patent: Aug. 24, 2004

(54) SELF-COMPENSATING HOSE COUPLING

(75) Inventors: Edward A. Green, Mantua, OH (US); Dominic Profio, Ravenna, OH (US)

(73) Assignee: Saint-Gobain Performance Plastics Corporation, Mantua, OH (US)

( * ) Notice: Subject to any disclaimer, the term of this patent is extended or adjusted under 35 U.S.C. 154(b) by 167 days.

(21) Appl. No.: 10/008,582

(22) Filed: Nov. 13, 2001

(65) Prior Publication Data

US 2003/0088965 A1 May 15, 2003

(51) Int. Cl.7 .............................................. B21D 51/16
(52) U.S. Cl. ............................ 29/890.144; 29/890.44; 285/114; 285/115; 285/116; 285/239; 285/251; 285/258; 285/378
(58) Field of Search ...................... 29/890.44, 890.144, 29/890.14; 285/114, 115, 116, 239, 251, 258, 378

(56) References Cited

U.S. PATENT DOCUMENTS

| 3,941,254 | A | | 3/1976 | Sweger | |
|---|---|---|---|---|---|
| 5,181,750 | A | * | 1/1993 | Reum | 285/38 |
| 5,286,068 | A | * | 2/1994 | Wiebe | 285/114 |
| 6,193,282 | B1 | | 2/2001 | Assenheimer | |
| 6,435,564 | B1 | * | 8/2002 | Hohmann et al. | 285/115 |

* cited by examiner

Primary Examiner—Joseph J. Hail, III
Assistant Examiner—Shantese L. McDonald
(74) Attorney, Agent, or Firm—Wood, Herron & Evans, L.L.P.

(57) ABSTRACT

A connection for a tube is formed by placing a coiled spring around an end of a tube and inserting a barbed tubular portion from a connection into the tube. The connection forces the tube to expand applying pressure against the coil spring and forcing it to expand and exert radial pressure against the tube towards the inserted tubular portion.

9 Claims, 5 Drawing Sheets

SELF-COMPENSATING HOSE COUPLING

Plastic hose and tubing is used to transport a variety of different gases and liquids. The plastic tubing must be connected at either end using some type of fitting. A hard fitting such as a metal fitting is particularly useful and preferred. Generally these have a barbed tubular portion which slides into the hose or tubing and a coupling such as a threaded section or the like at the opposite end. The tubular portion is preferably barbed and is larger than the internal diameter of the tube. The barbed portion is forced into the end of the tube stretching it and is held by compression.

In many applications compression fitment is not adequate over the long term. Thermal cycles allow the tubing to expand. Also, internal pressures tend to act upon the tubing causing it to expand. Such barbed-style compression fittings rely on the elastic properties of the material to maintain sealing compressions. These designs are prone to leakage with temperature cycling as the plastic material relaxes.

There are spring-type clamps that can be installed after the assembly is made which cause compression pressure in a narrow area under the clamp. These require a secondary operation to install. Unless several of the clamps are applied, only a very small portion of the barb is actually affected.

Other types of fittings form a seal from the deformation of a metal sealing ring or ferrule compressed around the tubing by tightening a threaded nut. The sealing force relies on the elastic properties of the plastic material retaining compression when deformed. This fitting design is common and gives adequate performance. However if the assembly is exposed to cycling temperature or the plastic material relaxes and the sealing compression is reduced, leakage may occur. An exemplary such device is shown in FIG. 4. This device also employs a spiral spring to prevent the end of the tube from kinking. Such a spiral spring does not actually engage the plastic tubing holding it in position. The spring itself is used purely for prevention of kinking of the end of the hose as is commonly used.

Another such device is shown in U.S. Pat. No. 5,286,068 which actually uses a multi-component fitting to force the spring against the tubing itself and the tubing itself simply is marginally engaged by the spring itself. Other spring-type clamps are disclosed for example in Sweger, U.S. Pat. No. 3,941,254 and Assenheimer, U.S. Pat. No. 6,193,382 B1.

The present invention is premised upon the realization that an extremely secure tight connection can be formed between the end of a coupling and plastic tubing wherein the exterior of the plastic tubing is engaged by a coil spring. More particularly, such a coupling is formed by placing a coiled spring around a distal end of a plastic tube and inserting a barbed tubular member into the interior of the tube. The barbed tubular member causes the plastic tubing to expand causing the coil spring to likewise expand and at the same time apply compressive force against the exterior of the tube.

This coupling finds particular application in automotive environments particularly air brake tubing. However, it can be used in virtually any application in which a plastic tube is fitted with a hard or metal coupling. The particular metal coupling can be either a male or female coupling. Further it can be a threaded or bayonet-type fitment or other snap-on fitment or the like.

The objects and advantages of the present invention will be further appreciated in light of the following detailed description and drawings in which:

DETAILED DESCRIPTION

Figure 1:
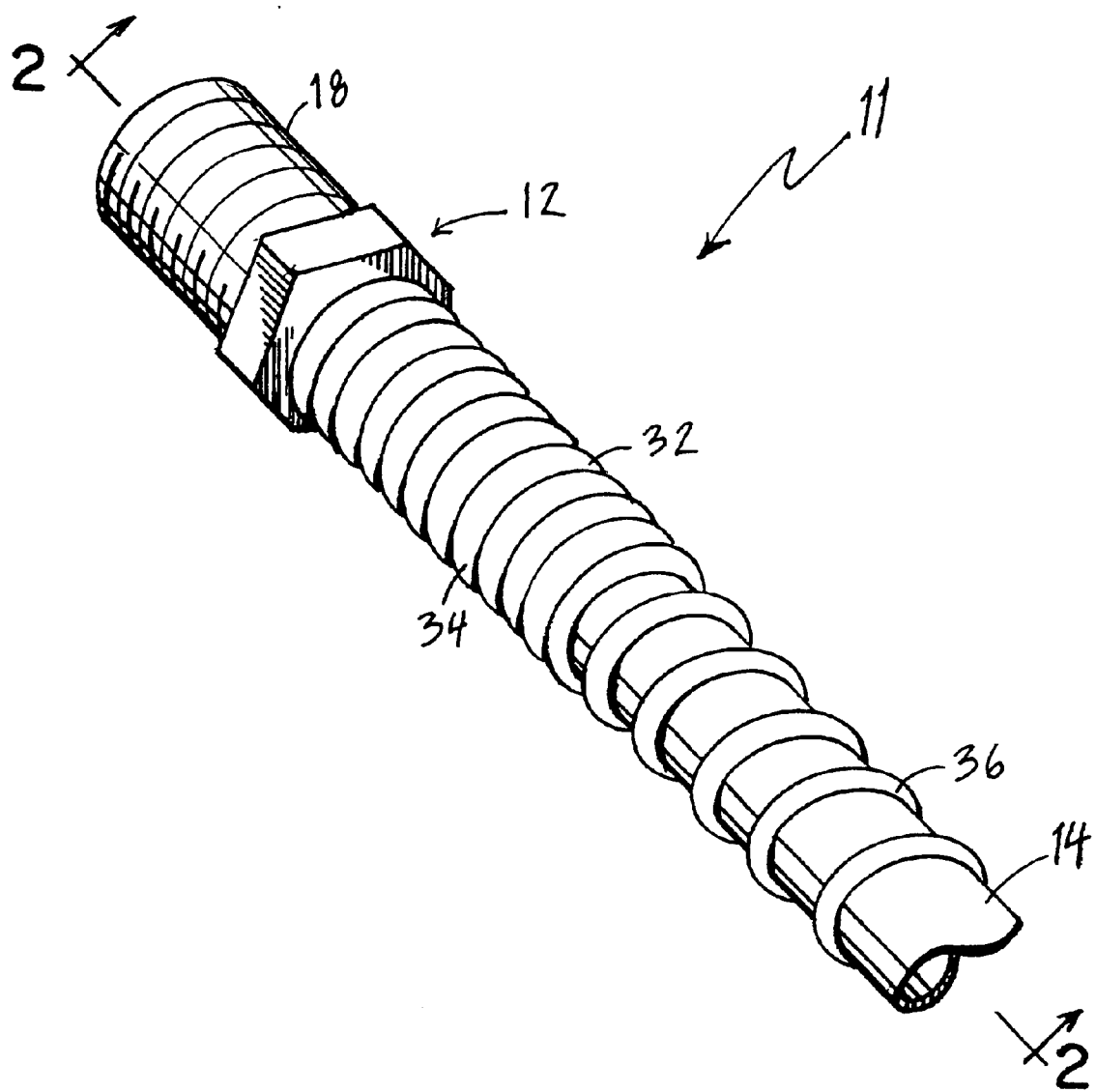
FIG. 1 is a fragmentary perspective view of the present invention.

As shown in FIG. 1, the present invention 11 is plastic tubing 14 fitted with one or more end couplings 12 (one end shown). Tubing 14 can be used to transport a variety of different fluids including various gases including air, liquids and the like. It has particularly valuable application as air brake tubing. However, the present invention is certainly not limited to such an application.

Coupling or fitting 12 has a connecting portion 18 and a tubular portion 20. The connecting portion 18 can be any of a variety of different connecting members. It is shown with external threading however it could have internal threading, it could be a snap on or bayonet-type fitment or any other type of connection. The tubular portion 20 is shown with barbs 22 which facilitate connecting the tube 14 to the fitting 12. However, the barbs are not absolutely essential but are preferred.

Figure 2:
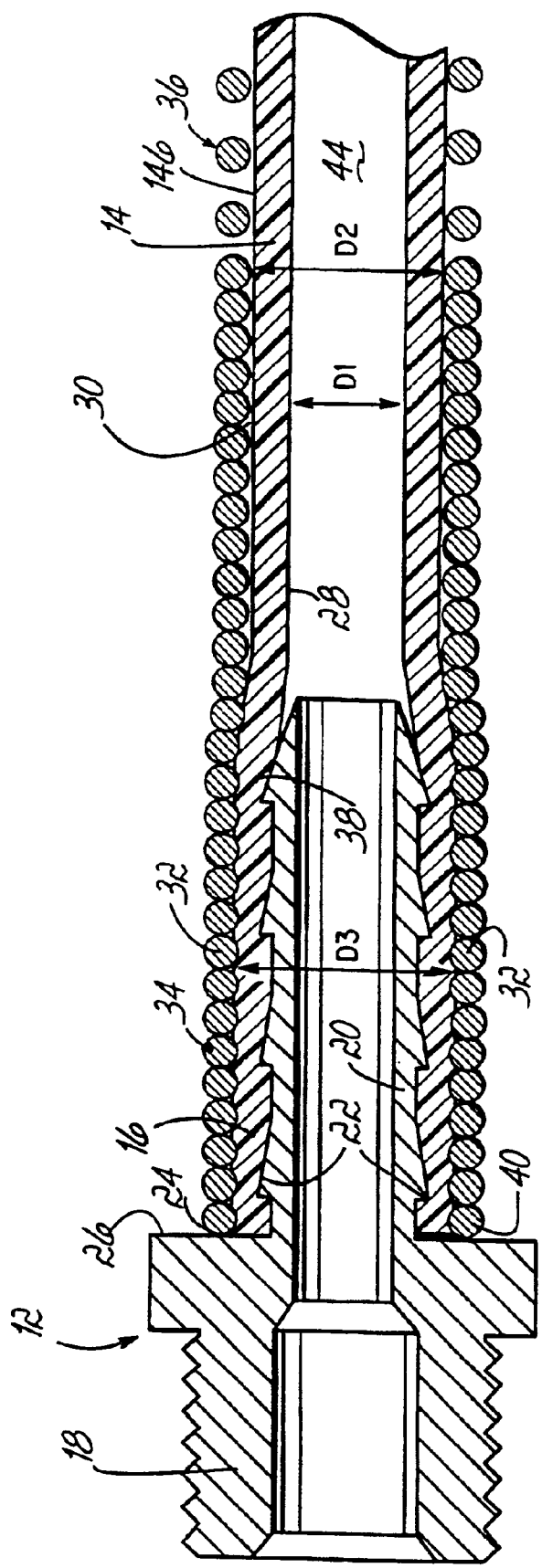
FIG. 2 is a cross-sectional view taken at lines 2—2 of FIG. 1.
Figure 3:
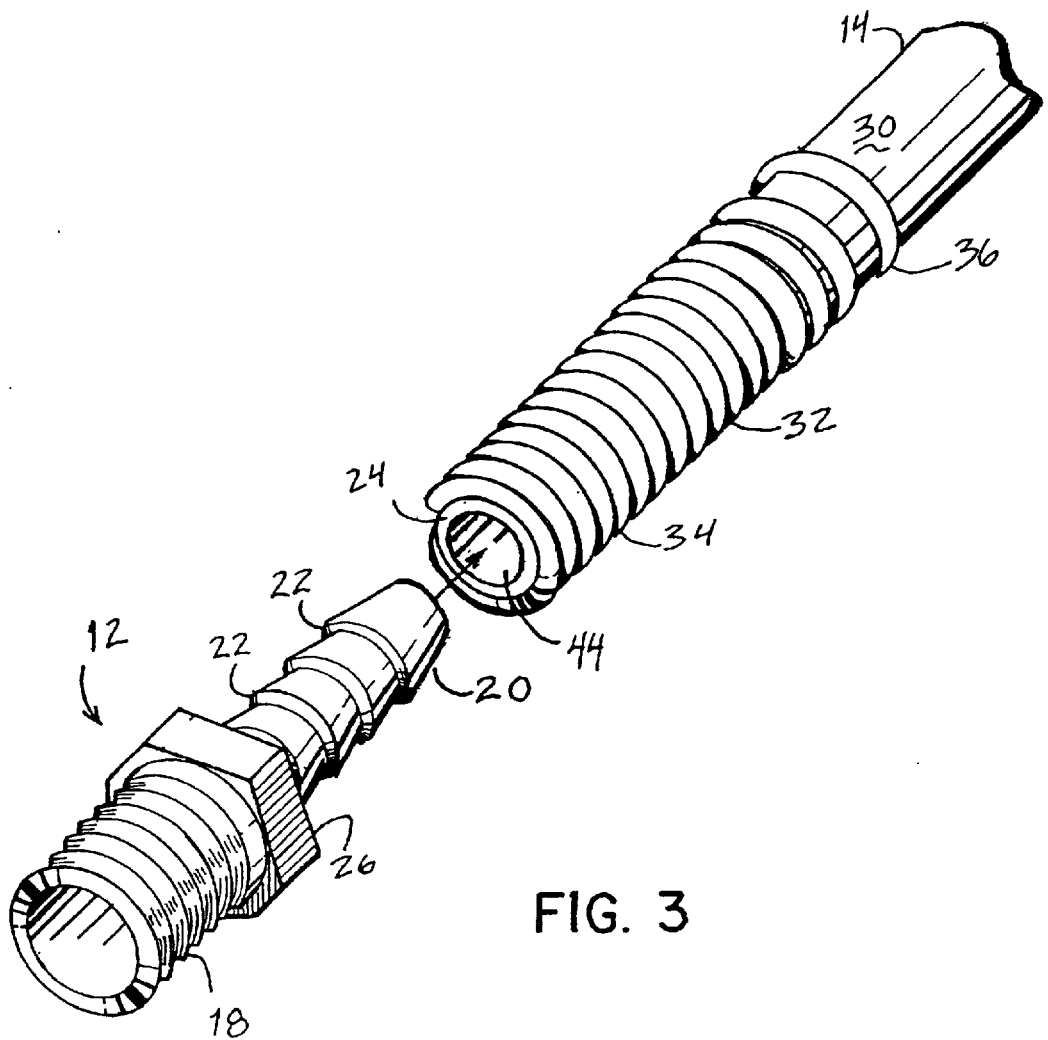
FIG. 3 is a perspective view of the present invention prior to assembly.
Figure 4:
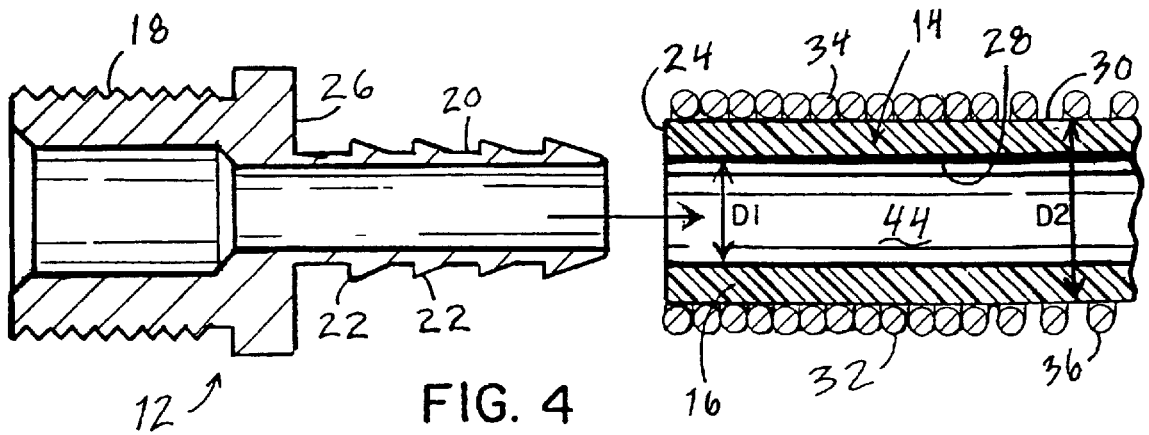
FIG. 4 is a cross-sectional view of the present invention prior to assembly.

As shown in FIG. 2, the end portion 16 of tube 14 surrounds the tubular portion 20 with the distal end 24 of the tube 14 abutted against a shoulder 26 connecting portion 18. The tube 14 has an internal surface 28 which forms an air-tight seal between the tubular portion 20 of fitting 12 and the tube end 16. The tube 14 has an unstretched internal diameter D1 and an external surface 30 having an external diameter when it is unstretched of D2 and when it is stretched over the tube portion 20, a larger diameter of D3.

Surrounding the tube end 16 and particularly the portion of the tube that is covering tube portion 20 is a coil spring 32. The coil spring 32 has a tightly coiled forward portion 34 and a more loosely coiled rear portion 36. It likewise has an internal surface 38 which in an unstretched state has a diameter approximately equal to the external diameter D2 of the tube when in an unstretched position.

As shown in FIG. 2, the portion of the coil spring 32 surrounding the tube end 16 which covers tubular portion 20 is in a stretched condition and has a diameter less than the diameter of the external surface of the tube D3 and is embedded into the external surface 30 of the tube end 16. The coiled spring is in a stretched tensional state around tube end 16 applying radial pressure against surface 30 maintaining an air tight seal.

Figure 5:
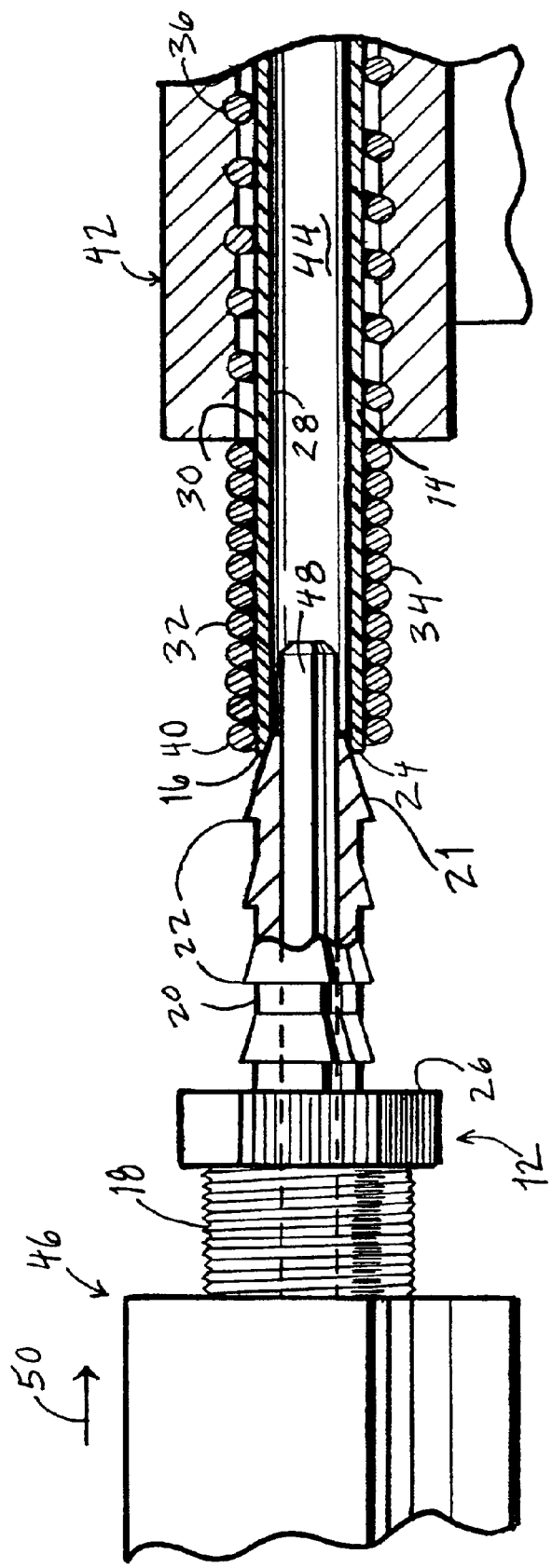
FIG. 5 is a perspective view partially in cross-section showing the assembly of the present invention.
Figure 6:
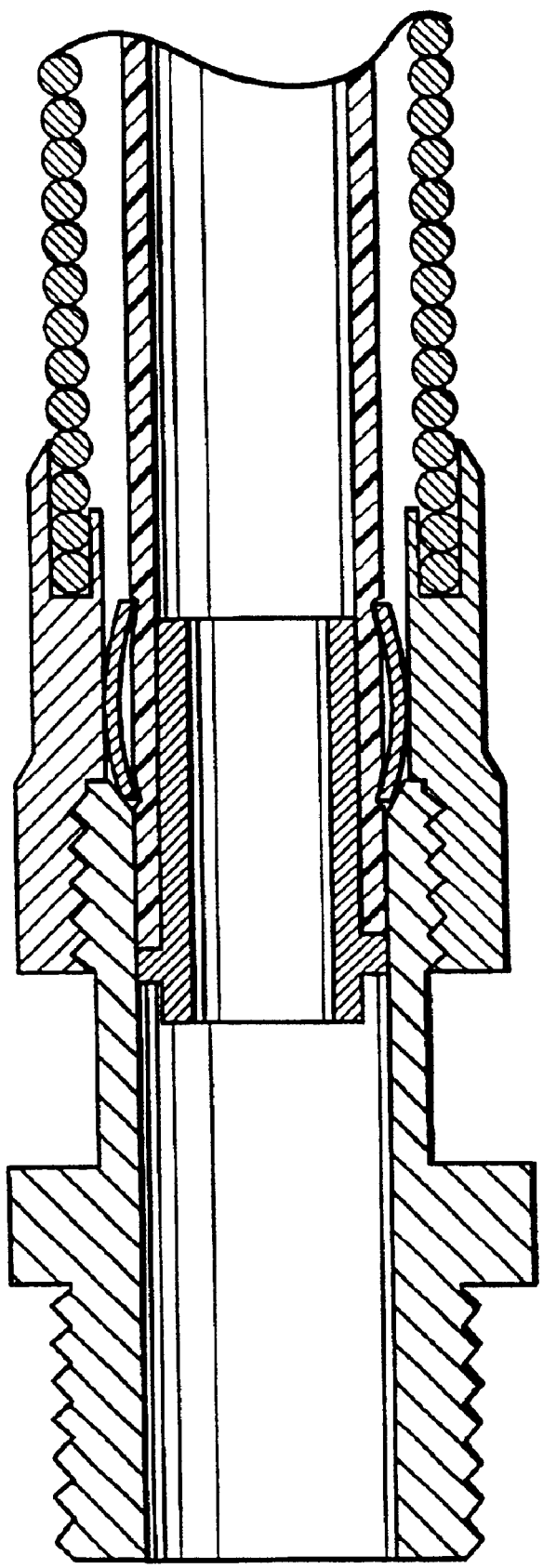
FIG. 6 is a cross-sectional view of a prior art hose fitment.

As shown in FIG. 5, the fitting 12 of the present invention is assembled in a single step. The spring 32 is simply slipped over the tubing 14 so that the end 40 of spring 32 is immediately adjacent the end of tube end 24.

The spring 32 is held by clamp 42 which presses spring 32 against tube 14. The tubular portion 20 of fitting 12 is forced into the interior 44 of the tube as the spring 32 is held in position. The fitting 12 engaged by a hydraulic ram diagrammatically shown as 46 in FIG. 5. The ram includes a guide rod 48 which extends through the connector 12 and through tubular portion 20. Rod 48 is inserted into the tube end 16 which guides the tube portion 20 into the end of the tube. Tube portion 20 is tapered as at 21 to facilitate entry into the tube. The hydraulic pressure is then applied as shown by arrow 50 which will force the tubular portion 20 into end 16 of tube 14.

As the tubular portion 20 is inserted into the tube end 16, it will cause the tube to expand outwardly so that the outer surface 30 of the tube 15 14 expands from diameter D2 to diameter D3. This in turn will force the coil spring 32 to expand. Since this is held in position by clamp 42, tube 14 does not initially move. As the tube portion 20 is inserted inwardly and the tube 14 expands, the spring 32 actually holds itself in position engaging the tube wall 30. The pressure from the expansion of the tube wall will cause the coil spring 32 to expand radially. The hydraulic ram continues to insert the tubular portion 20 into the tube end 16 until the distal end 24 engages the fitment 12. The hydraulic ram is then withdrawn and the fitment is in place. The spring applies radial force against the tube wall which holds the tube in position. In this condition, the spring is in a stretched condition which applies continual radial force against the tub and thus against the tubular portion 20 of the fitment 12.

Although much less preferred, the tubular portion 20 could be forced into said tube end 16 first and the coiled spring 32 forced over said tube end. But this is a two-step process and therefore more expensive and would also tend to damage the tubing.

The relative dimensions of the outside diameter of the tubular portion 20 relatively to the inside diameter of the tubing 14 and the internal diameter of the spring 32 in an unstretched position combine to form a tight fitment. The inside diameter of the coil spring 32 should be approximately equal to the external diameter of the tubing 14 when both are in an unstretched condition. The spring should be able to be placed over the tube easily without significant mechanical assistance and preferably by hand. This allows the spring to be easily inserted over the tubing without prior stretching of the spring. The internal diameter of the spring can be slightly greater than the external diameter of the tubing. However, this is less preferred. A snug fit wherein the spring is equal to or perhaps a millimeter smaller than the external diameter of the tubing allows the spring to be easily inserted over the tube end without sliding in an uncontrolled manner.

The tubular portion 20 of the fitting 12 is larger than the internal diameter of the tubing 14 causing the tubing to expand when the tubular portion 20 is inserted into tube 14. As an example, tubing 14 may have an internal diameter of 0.375". The outside diameter of tubular portion 20 measured from barb to barb (if barbs are present) may be 0.470". This causes an expansion of the internal diameter of the tube of slightly greater than 25%. The tubing outside diameter may have an exemplary diameter of 0.530" when in an unstretched position and an exterior diameter of 0.590" with the tubular portion 20 of fitting 12 inserted. This would provide for an expansion of 11.3%. The spring, on the other hand, will have an unstretched outside diameter of about 0.678" with an internal diameter of from approximately 0.52" to 0.54". The external diameter of the spring when inserted over the fitting expands to about 0.7" providing a spring expansion of about 3% whereas the outside expansion of the tube is approximately 11%. This indicates that the spring actually imbeds itself into the surface of the plastic tubing. Although not critical, the spring should expand about 1% to 5%.

The tubing 14 can be formed from a wide variety of different plastics depending upon the particular application. It can be fiber reinforced nylon, fiber reinforced laminated tubing such as a nylon/polyurethane/nylon laminate and can be formed from polyolefins, polyvinyl alcohols and the like. Generally it will be flexible at room temperature and meet any other application requirements. The fitting and spring can be formed for hard plastic or any suitable metal such as copper, stainless steel or brass. The spring may be galvanized if desired.

The connection of the present invention along with the method of forming this connection provides many different advantages. From an assembly point of view, the process requires only one step. The spring and the fitting are inserted in one quick operation. Further, the spring itself will remain in a tensioned condition applying kinetic energy to the connection.

As expansion and contraction, the spring will compensate for any changes maintaining radial compressive force against the fitment.

Thus, the present invention provides a significantly improved fitment which is not significantly greater in cost than standard prior art fitment. This has been a description of the present invention along with the preferred method of practicing the present invention. However, the invention itself should only be defined by the appended claims wherein we claim:

What is claimed is:

1. A method of applying a fitting to a tube end said fitting having a connection portion and a tubular portion adapted to be inserted into said end tube;

said tubular portion having an external diameter greater than an internal diameter of said tube end;

said tube end having a first external diameter and a second larger diameter when said tubular portion is inserted within said tube end;

said method comprising placing a coil spring around said tube end said coil spring having an internal diameter less than said second larger diameter of said tube;

holding said coil spring stationary and forcing said tubular portion into said tube end as said coil spring is held stationary causing said tube to expand forcing said coil spring to expand at least 1% and causing said spring to embed itself into the exterior surface of said tube;

wherein said coil spring exerts continuous radial compressive force around said tube end.

2. The method claimed in claim 1 wherein said coil spring is forced to expand from about 1% to about 5%.

3. The method claimed in claim 1 wherein said tubular portion is barbed.

4. The method of applying a hose fitment to a tube end said fitting having a connecting portion and the tubular portion said tubular portion having an external diameter greater than the internal diameter of the said tube end;

said tube end having a first external diameter and a second larger diameter when said tubular portion is inserted within said tube end;

said method comprising forcing said tubular portion into said tube end causing said tube to expand;

forcing a coil spring in an axial direction over said tube end wherein said coiled spring has an internal diameter in an unstretched condition less than the external diameter of said second larger diameter of said tube wherein the internal diameter of said tube end is expanded more than an internal diameter of said coil spring on a percentage basis and whereby said coiled spring expands at least 1% and thereby exerts continuous radial compressive force against said tube end and embeds itself into an exterior surface of said tube.

5. The method claimed in claim 4 wherein said coil expands at least 3%.

6. The method claimed in claim 4 wherein said coil spring surrounds substantially said entire tube portion applying radial compressive force against said entire tube portion.

7. Plastic air brake tubing comprising tubing and a fitting said fitting including a tubular portion inserted in an end of said tube;

a metal spring consisting of a coiled portion said spring covering said tube end over said tubular portion and being in an expanded state and exerting radially inward pressure against said tube end towards said tubular portion wherein said coiled spring is expanded from about 1% to about 5% from an at rest condition and wherein said spring is embedded into an exterior portion of said tube end.

8. The method claimed in claim 1 wherein said spring is metal.

9. The air brake tubing claimed in claim 8 wherein said tube comprises nylon.

* * * * *